Dec. 13, 1966  M. J. DUNNE  3,291,971
CONTROL SYSTEM
Filed Feb. 25, 1963  3 Sheets-Sheet 1

INVENTOR.
MAURICE J. DUNNE
BY
Mason, Kolehmainen,
Rathburn and Wyss.
Attorneys

Dec. 13, 1966  M. J. DUNNE  3,291,971
CONTROL SYSTEM
Filed Feb. 25, 1963  3 Sheets-Sheet 2

INVENTOR.
MAURICE J. DUNNE
BY Mason, Kolehmainen,
Rathburn and Wyss.
Attorneys

INVENTOR.
MAURICE J. DUNNE
BY
Mason, Kolehmainen, Rathburn and Wyss.
Attorneys

United States Patent Office 3,291,971
Patented Dec. 13, 1966

3,291,971
CONTROL SYSTEM
Maurice J. Dunne, Newtown, Conn., assignor to Unimation, Inc., Bethel, Conn., a corporation of Delaware
Filed Feb. 25, 1963, Ser. No. 260,422
7 Claims. (Cl. 235—151.1)

The present invention relates to control systems, and, more particularly, to control systems of the type wherein a movable member is controlled in accordance with numerical input data.

In the field of numerical control systems, many different arrangements have been proposed for moving a controlled member in accordance with numerical input data. One general type of system employs a numerical input command in the form of a number in binary code and a digital servo arrangement is employed to move the controlled part. This digital servo produces a position number in binary code form corresponding to the actual position of the part which is compared with the input command number and the difference between these two numbers is employed to move the controlled part to the desired position represented by the command number. While these systems have, in general, been satisfactory for their intended purpose, it has been found that when the command and position numbers are provided in the form of a conventional or natural binary code, during code comparison succeeding numbers in the codes may have all or substantially all of their digits changing at once and large errors can arise if all of the changing digits do not change together and without any substantial lag or overlap.

In order to reduce errors in counting or positioning when a conventional or natural binary code system is employed, it has heretofore been proposed to use a reflected binary code in which only one digit changes between successive numbers in the code. However, in those instances wherein a reflected binary code system has been employed, it has been considered necessary to employ an intermediate code for the comparison. Such an intermediate code has been considered necessary in those systems employing reflected code notation based on the assumption that a direct comparison of the reflected binary codes would require a large amount of apparatus per digit in order to determine suitable direction and speed boundary data.

It is, therefore, an important object of the present invention to provide a new and improved control system for moving a controlled member in accordance with numerical input data in which reflected codes representing the actual and desired positions of the movable member may be directly compared to provide direction information without the use of an intermediate code for comparison purposes.

It is another object of the present invention to provide a new and improved control system in which reflected codes representing actual and desired positions of a movable member may be directly compared to cause movement of the member to the desired position and means are provided for determining with respect to each digit of the actual and desired numbers whether or not that digit has been reflected.

It is a further object of the present invention to provide a new and improved control system in which numerical input data is converted to a first electrical command signal in reflecting code form representing the desired distance of movement of a movable member and said electrical signal is compared with an electrical position signal in the same reflected code form and representing the actual position of the movable member, wherein facilities are provided for determining by examination of the respective digits of said command and position signals the direction in which said member has to be moved to position it properly while taking into account the reflections of any digits in said command and position numbers during movement of said member to said desired position.

It is another object of the present invention to provide a new and improved control system for moving a controlled member in accordance with numerical input data wherein reflected codes representing the actual and desired positions of the movable member may be directly compared to provide direction information for moving the member to the desired position and a large number of slowdown points may be obtained by said direct comparison and without employing an intermediate code transformation.

The invention, both as to its organization and method of operation, together with further objects and advantages thereof, will best be understood by reference to the following specification taken in connection with the accompanying drawings in which.

Figure 1:
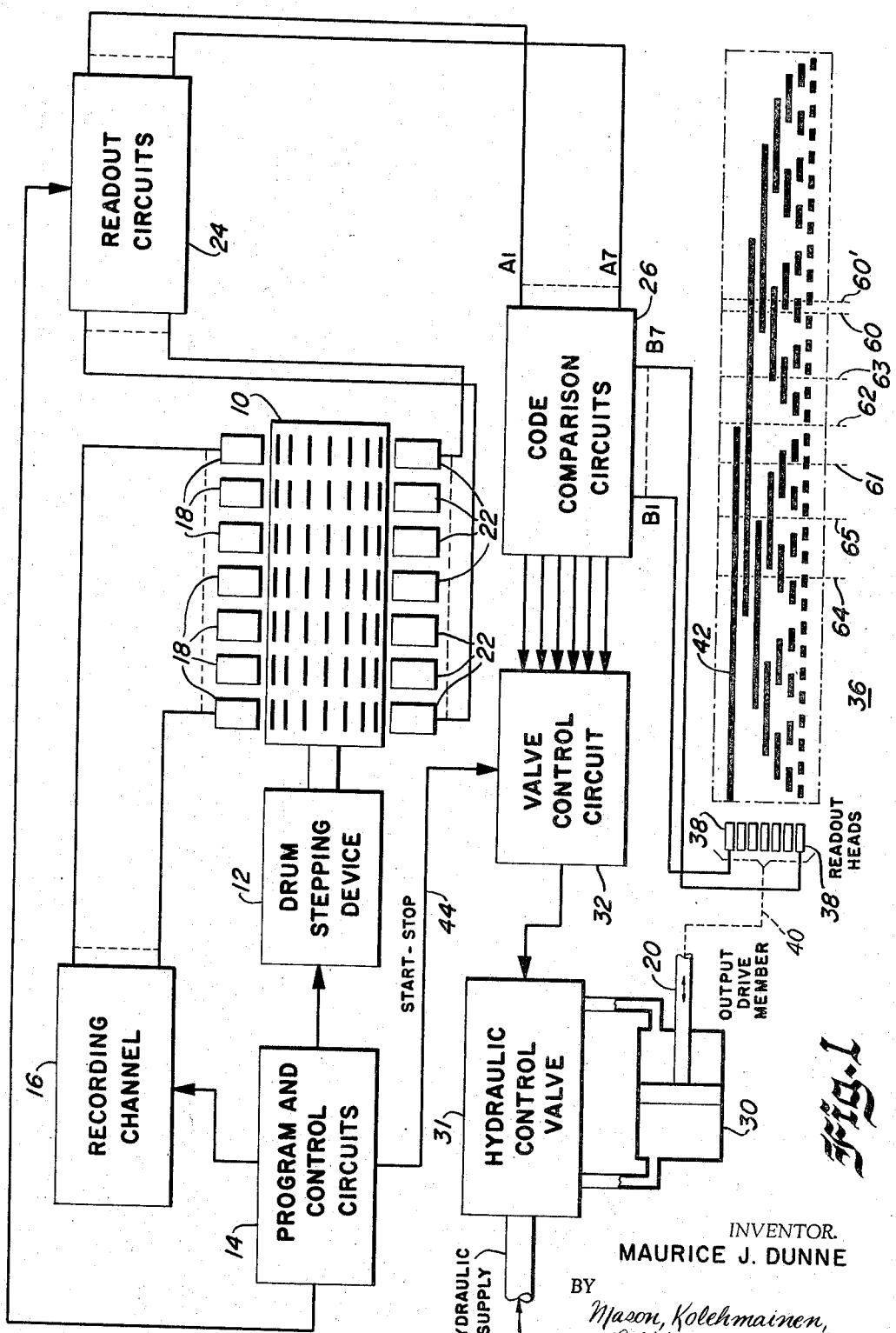
FIG. 1 shows in block diagram form a control system embodying the features of the present invention.

Referring now to the drawings and more particularly to FIG. 1 thereof, the control system of the present invention is therein illustrated as including a magnetic storage drum indicated generally at 10 which is moved in step-by-step fashion by means of a drum stepping device 12 under the control of suitable program control circuits 14. A recording channel 16, which may be controlled from the program control circuits 14, provides an output for a series of recording heads 18, one for each digit of the number which is to be stored on the drum 10. In the illustrated embodiment a series of seven recording heads 18 are provided so that a seven digit code may be recorded on the drum 10 at any particular angular position thereof. For purposes which will be clarified hereinafter, the seven digit number recorded on the drum 10 is in reflected binary code form wherein successive numbers of the code differ by only one digit. In this connection it will be understood that the surface of the drum 10 may contain magnetically retentive segments or bits arranged in horizontal rows along the length of the drum 10 and positioned so that each successive row comes under the recording heads 18 as the drum is stepped by means of the drum stepping device 12. Each bit can be polarized in either of two directions so as to provide the conventional binary "1" or binary "0" corresponding to each digit of the reflected binary code number which is recorded. Also, while only a seven digit code is provided in FIG. 1, it will be understood that a considerably larger number of digits will normally be provided along the length of the drum 10 so as to provide for accurate positioning of the controlled member.

Each of the reflected binary command numbers recorded on the drum 10 represents a desired position of a controlled output number 20 and after a desired number of successive positions of the controlled member 20 have been programmed by recording the corresponding reflected binary numbers on the drum 10, these numbers may be read out by a suitable series of reading or sensing heads 22, one of the heads 22 being provided for each digit of the reflected binary number. Preferably, the read heads 22 are arranged to respond to the polarity of the magnetic flux produced in the magnetically retentive bits on the surface of the drum 10 and are unaffected by the rate of change of flux intensity so that the drum 10 does not have to rotate past the reading heads 22 to provide a suitable output. The drum 10 may thus be held stationary with the desired row of magnetized bits under the reading heads 22 until such time as the member 20 has been moved to the position represented thereby at which time the drum is moved by one step under the control of the device 12 so that the next row of bits is presented to the reading heads 22. A form of flux responsive sensing head suitable for such operation is shown, for example, in Devol Patent No. 2,590,091, issued March 25, 1952, and Devol Patent No. 2,988,237, issued June 13, 1961.

Each of the reading heads 22 produce a binary "1" output if the magnetizable bit is polarized in one direction and a binary "0" if the bit is polarized in the opposite direction. The output signals from the reading heads 22 are supplied to a group of readout circuits 24 which are controlled by the programmed control circuit 14 so as to supply suitable signals representing the digits of the reflected binary number which is read on the drum 10 over the conductors A1 to A7, inclusive, to the code comparison circuits 26. The output member 20 is arranged to be driven by any suitable arrangement such as a hydraulic actuator 30 which is actuated by a hydraulic control valve 31 under the control of a valve control circuit 32.

In order to provide a numerical or digital indication of the actual position of the controlled member 20, there is provided an encoding arrangement which includes a stationary pattern of elements indicated generally at 36 in the form of a seven digit reflected binary code. A series of reading heads 38 are provided one for each digit of the pattern 36 and the reading heads 38 are arranged to be moved as a unit along the length of the pattern 36 in accordance with movement of the controlled member 20, this mechanical connection being indicated by the dotted line 40. Each of the reading heads 38 is arranged to provide a binary "1" or binary "0" output in accordance with the digits of the reflected binary code in the pattern 36, as will be readily understood by those skilled in the art. In this connection it will be understood that the binary "1" condition for each digit is delineated by the black portions of the pattern 36, such as the portion 42 of the highest order digit in the pattern 36, and a binary "0" condition is indicated by the portions intermediate the darkened areas of the pattern along the length of each digit.

Considering generally the operation of the control system of FIG. 1, the successive positions to which the controlled member 20 is to be moved are first recorded on the drum 10. During this operation a stop signal may be transmitted from the program control circuit 14 by way of the conductor 44 to the valve control circuit 32 so as to close this valve and prevent movement of the controlled member 20. In the alternative, a suitable control signal may be supplied from the program control circuit 14 to the circuit 32 to move the member 20 to the desired position under the control of a suitable push button so that the member 20 may be "taught" a successive group of positions to which it is to be moved. As the member 20 is moved to each position, signals may be derived from the read heads 38 and supplied by way of the recording channel 16 to the recording heads 18 so as to record on the drum 10 the reflected binary number representing the successive positions to which the members 20 is to be moved. In either case, once the positions to which the member 20 is to be moved have been recorded on the drum 10, the drum may then be employed to move the output member 20 through the cycle of positions recorded on the drum 10 as many times as this cycle is desired to be repeated.

The drum 10 is first stepped to the position in which the first reflected binary number is under the reading heads 22 and a control signal is supplied over the conductor 44 so that the valve control circuit 32 is controlled by the output of the code comparison circuits 26.

The first "command" number thus read from the drum 10 is supplied through the readout circuits 24 to the A1–A7 inputs of the code comparison circuits 26. Depending upon the actual position of the member 20, a particular reflected binary "position" number will be produced by the reading heads 38 and supplied to the other input of the code comparison circuits 26 by way of the conductors B1 to B7, inclusive. These two reflected binary numbers are compared directly in the circuits 26 so as to provide an output signal to the valve control circuit 32 which is effective to move the member 20 in the desired direction. Furthermore, the circuits 26 are effective to provide a series of slowdown control signals to the circuit 32 so that when the actual position of the member 20 comes within a predetermined distance of the command number recorded on the drum 10 the speed of movement of the member 20 is reduced. A number of these slowdown points may be provided so that the member may be moved with maximum speed to the desired position while controlling the velocity and deceleration rate of the member to prevent mechanical overstress, overshoot and hunting about the desired position.

Figure 2:
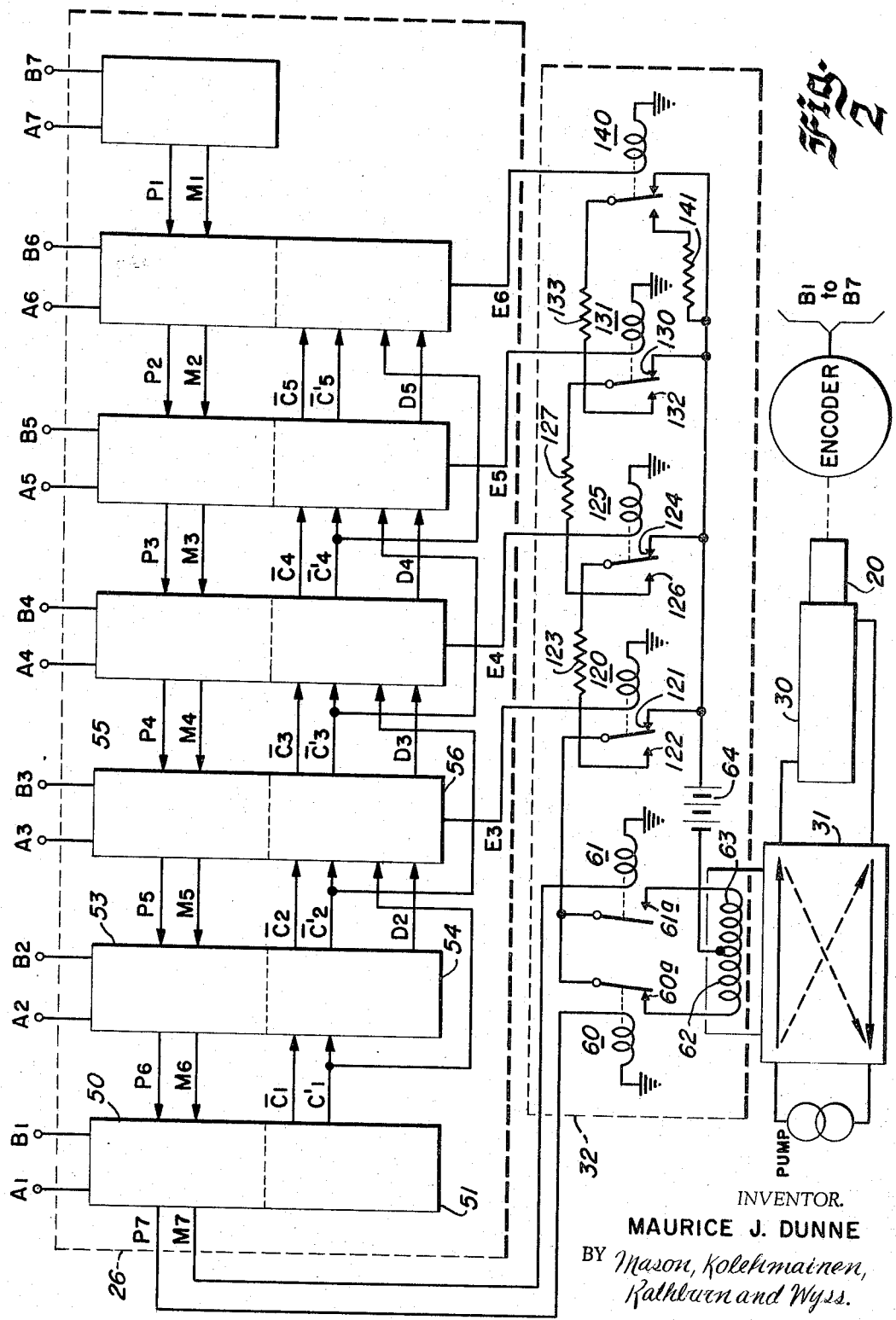
FIG. 2 is a schematic and block diagram of the code comparison and driving member control portion of the system of FIG. 1.
Figure 3:
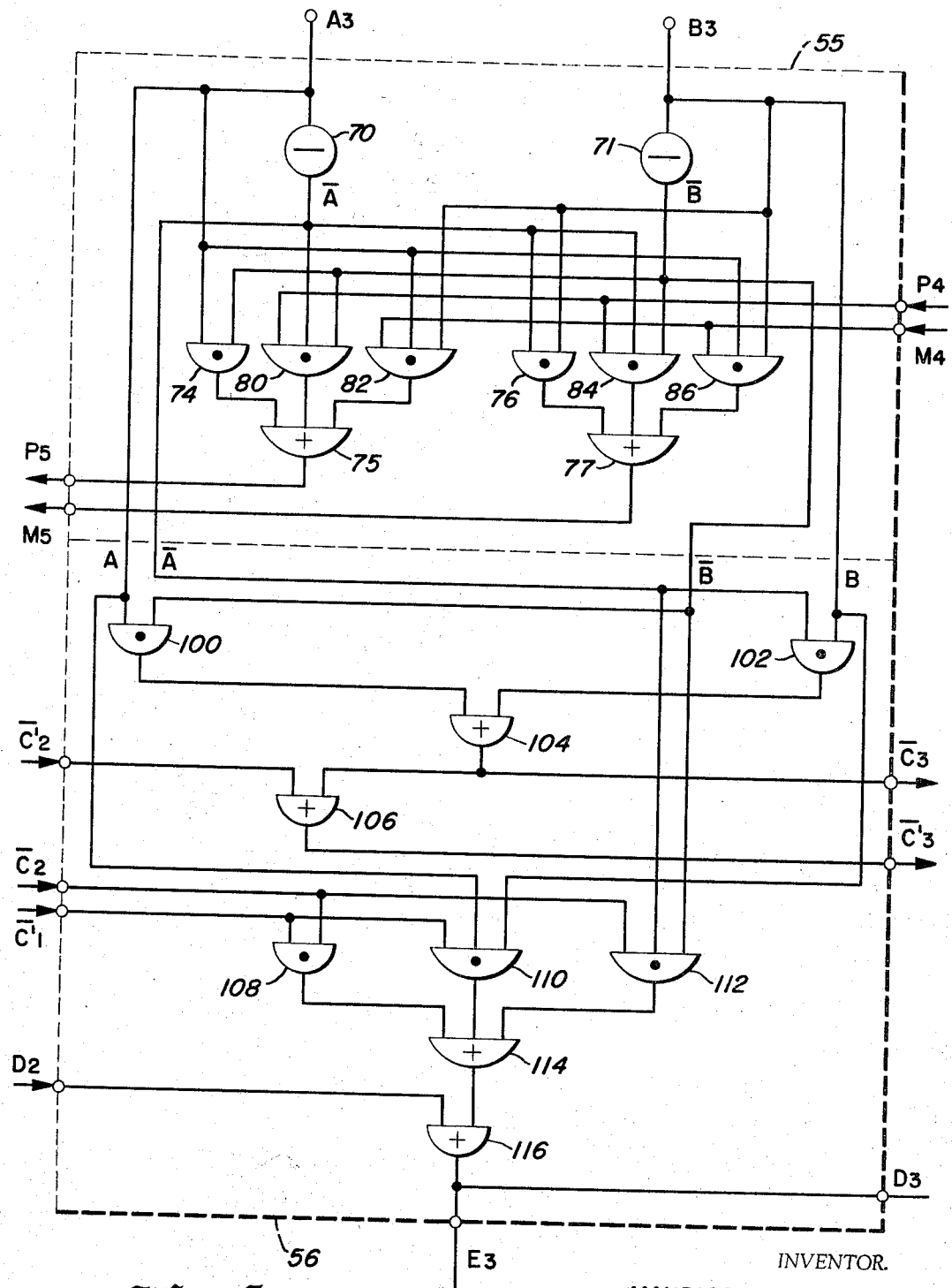
FIG. 3 is a schematic showing the circuitry required for comparison of each digit in the comparison circuit of FIG. 2.

Referring now more particularly to FIGS. 2 and 3 wherein the circuitry of the code comparison circuit 26 is shown, a first group of logic circuits are provided for each digit of the reflected binary numbers to determine the required direction the controlled member 20 is to move and a further group of logic circuits are provided for each digit to determine the boundaries of movement or slowdown points at which movement of the controlled member is to be reduced in successive steps, to prevent overshoot and the like. More particularly, the highest order or most significant digit has provided a first group of logic circuits 50 to determine direction and a second group of logic circuits 51 for the determination of desired slowdown points. The logic circuits 50 and 51 are supplied with an output signal corresponding to the highest order read head 22, indicated by the terminal A1 and a signal from the highest order read head 38 associated with the pattern 36, indicated by the terminal B1. In a similar manner, the signal representing the second highest order digit of the command number is supplied to the terminal A2 and the second highest order signal provided by the read heads 38 is supplied to the terminal B2 for the logic circuits 53 and 54 associated with this second digit. In a similar manner the other digits of the command and position numbers are supplied to the logic circuits provided for each of the remaining digits of these numbers, the third order logic circuits 55 being provided to determine direction and the circuits 56 being provided to determine a suitable slowdown point. The logic circuits associated with each digit are identical and one such group of logic circuits is shown in detail in FIG. 3 of the drawings for the third highest digit which receives the signals A3 and B3. It will be understood that the logic circuits provided for each of the other digits in the code comparison circuit 26 are identical to those shown in FIG. 3 in connection with the third highest digit, except as described hereinafter.

In considering the manner in which the desired direction of movement of the controlled member 20 is derived by means of the logic circuits 50, 53, 55, etc., it is first pointed out that when a reflected binary code is employed it is not sufficient to determine direction merely by noting the significance or direction of the most significant digit, as is conventionally done in connection with a natural binary code. Nor is it possible to determine direction by examining the significance or polarity of successive digits from the most significant digit on down because the correct significance to determine direction will be inverted in certain areas of the reflected binary code pattern due to the inherent nature of the reflected binary code. This may be readily seen by considering the situation wherein a command number representing the position 60 is read from the drum 10 and the actual position of the member 20 corresponds to the reflected binary number shown at the position 61 on FIG. 1. If we consider only the most significant digit we see that an anticoincidence signal exists with respect to this digit with a binary "1" being produced on the B1 channel and the binary "0" signal being produced in the A1 channel. If it is assumed that this particular anticoincidence signal indicates that the controlled member 20 is to move in the direction of the command number 60 it will be evident that as soon as the member has been moved to a point at which coincidence occurs in the most significant digit, i.e., the position 62 in FIG. 1 a reversal of direction is indicated. Thus, when the member 20 is in the position 62 coincidence signals occur in both the most significant digit and the next succeeding digit. However, in the third digit we have an anticoincidence signal of the reverse polarity, i.e., a binary "0" signal appears in the B channel and a binary "1" signal appears in the A channel. This would indicate that the direction of movement of the member 20 should be reversed which if followed would move the member further away from the desired position 60.

In accordance with an important feature of the present invention, it has been found that the proper direction for movement of the controlled member 20 may be derived by direct comparison of the two reflected binary codes if consideration is given to the nature of the coincidence signals existing in the higher order digits above the highest order difference or anticoincidence signal. Thus, it has been found that the correct polarity of direction signal may be maintained at all times by reversing the significance of the highest order difference signal a number of times equal to the number of coincidence signals of a particular nature which exist in the higher order digits. More particularly, in the arrangement shown in FIGS. 2 and 3, information as to the required direction of movement of the controlled member 20 is derived by first determining the highest order digit in which an anticoincidence or difference signal exists. The significance of this highest order difference signal is then reversed or inverted a number of times equal to the number of binary "1" coincidences existing in digits of higher order than said highest order difference signal. Such an arrangement has been found satisfactory under all conditions to provide proper direction information throughout the entire movement of the controlled member 20 from the actual to the desired positions and irrespective of the reflected nature of certain portions of the reflected binary code pattern. Furthermore, such an arrangement automatically provides for reversal of the direction of movement of the member in the event the member overshoots the desired command position.

Referring now to the logic circuits which are provided for each digit to derive direction information by direct comparison between the two reflected binary codes, the logic circuits 55 provided for the third digit are shown in detail in FIG. 3 of the drawings, it being understood that a similar group of logic circuits are provided for each of the other six digits of the code. In FIG. 3 a signal representing the third digit of the command number appears on the terminal A3 and a signal representing the third digit of the position number appears at the terminal B3. The A3 signal is inverted in the inverter 70 and the B signal is inverted in the inverter 71 so as to provide signals of the opposite polarity from the A3 and B3 input signals. In the illustrated embodiment of the system it is assumed that a binary "1" in the command digit and a binary "0" in the position digit requires movement in a particular direction designated the positive direction. Accordingly, the A3 signal is applied to one input of an AND gate 74 the other input of which is supplied with the output from the inverter 71. If a binary "1" appears at the terminal A3 and a binary "0" at the terminal B3 the AND gate 74 will produce an output which is supplied through an OR gate 75 to the positive lead P5 thus indicating movement in the positive direction insofar as the third digit itself is concerned.

In a similar manner the output of the inverter 70 is supplied to one input of an AND gate 76 the other input of which is supplied from the B3 terminal so that when a binary "0" signal appears at the A3 terminal and a binary "1" at the B3 terminal an output is produced at the output of the AND gate 76 which is supplied through an OR gate 77 to the negative terminal designated M5, thus indicating movement in the opposite or minus direction insofar as the third digit itself is concerned.

In the event that the A3 and B3 signals are in either a zero or ones coincidence condition, no output is produced through the AND gates 74 and 76 since such coincidence indicates that the third digit has been closed out to zero error. However, in accordance with the present invention, facilities are provided for passing along to the next highest order digit a plus or minus signal produced by the next lower order digit and for inverting the significance of this plus or minus signal in the event that the coincidence on the A3 and B3 leads is a coincidence of binary "1." More particularly, the three input AND gates 80 and 82 are provided with their output leads connected to the other two inputs of the three input OR gate 75. Similarly, the three input AND gates 84 and 86 are arranged to supply an output signal to the other two inputs of the three input OR gate 77.

A signal indicating movement in a positive direction may be derived from the next lower order digit and appear on the P4 lead and a minus or negative signal indicating movement in the other direction may appear on the M4 lead. The P4 lead is applied as one input to the AND gates 80 and 84 and the M4 lead is applied as one input to the AND gates 82 and 86. The A3 and B3 leads are applied as the other two inputs of the AND gates 82 and 86 and the outputs of the inverters 70 and 71 are applied as the other inputs of the AND gates 80 and 84. Accordingly, if a signal appears on the P4 lead and a binary "1" signal appears on the A3 and B3 terminals, i.e., a binary "1" coincidence, the AND gate 86 produces an output signal which is supplied through the OR gate 77 to the M5 lead. The significance of the signal appearing on the P4 lead is thus inverted in response to the binary "1" coincidence in the third order digit. On the other hand, if a signal appears on the M4 lead from the fourth digit and a binary "1" coincidence appears at A3 and B3, the AND gate 82 will produce an output signal which is transmitted through the OR gate 75 to the P5 lead so that the significance of the M4 signal is inverted and appears on the P5 output lead. If the A3 and B3 signals are both binary "0," i.e., a "0" coincidence signal, then either the AND gate 80 or the AND gate 84 will produce an output signal depending upon whether a signal appears on the P4 or M4 input lead and this signal is not inverted but instead is transmitted directly to the P5 or M5 leads, respectively.

In considering the operation of the logic circuits provided for each digit to determine direction, it should first be noted that in the last significant digit there is no P or M lead from a lower order digit and hence the gate circuits 75, 77, 80, 82, 84 and 86 may be eliminated in the direction determining logic circuits for the least significant digit and the outputs of the AND gates 74 and 76 are used directly as the P1 and M1 output signals. It is also pointed out that if an anticoincidence signal exists in a particular digit the direction information derived from the previous lower ordered digits is discarded and the direction information from that particular digit is utilized, since it is the highest order digit in which a difference signal exists. This applies all the way up to the most significant digit. For example, if it is assumed that a command number corresponding to position 60 in FIG. 1 exists, i.e., the reflected binary number 0111010 and the controlled member is at the position 61 in FIG. 1 corresponding to the reflected binary number 1100101, the direction determining logic will operate in the following manner. In the least significant digit the A7 terminal will have a binary "0" input and the B7 terminal will have a binary "1" input. This would produce an output signal on the M1 lead going to the next higher digit. However, since a difference signal exists on the A6 and B6 leads the information on the M1 lead is discarded and instead an output signal is produced on the P2 lead due to the presence of a binary "1" at the A6 terminal and a binary "0" at the B6 terminal. In the next higher order digit since a difference signal appears at the A5 and B5 terminals the information on the P2 lead is discarded and instead an output is produced on the M3 lead due to the presence of a binary "0" at the A5 terminal and a binary "1" at the B5 terminal. In the next higher digit a difference signal exists and hence the M3 information is discarded and an output appropriate to this difference is produced on the P4 lead. In the next higher digit, a binary "1" signal is produced on the A3 terminal and a binary "0" signal on the B3 terminal. While this is the same type of difference signal as appears on the A4 and B4 terminals, the information on the P4 lead is not transmitted through either of the gate circuits 80 or 86 because no coincidence signal exists on the A3 and B3 channels. Instead, a signal is independently generated on the P5 lead by the output from the gate circuit 74.

In the next higher digit a binary "1" coincidence signal appears on the A2 and B2 terminals. Accordingly, the gate circuit in the logic circuits 53 corresponding to the gate circuit 86 of FIG. 3 produces an output which is transmitted to the M6 lead, thus inverting the significance of the information previously produced in the P5 lead. However, in the most significant digit a binary "0" exists on the terminal A1 and the binary "1" signal on the terminal B1 so that the inverted direction information derived from the second digit is discarded and an output is produced on the M7 lead. This output is supplied to a relay 61 in the valve control circuit 32. Specifically, the servo valve 31 is provided with a pair of actuating coils 62 and 63. When either of the coils 62 or 63 is energized the valve 31 is opened by an amount proportional to the current flow in the coil so as to move the controlled member 20 at a proportionate speed. The coils 62 and 63 are reverse acting so that the member 20 may be moved in either direction. The relay 61 controls contacts 61a which when closed establish a circuit from the battery 64 through the contacts 121 of a relay 120 to the coil 63. The P7 lead energizes a relay 60 whose contacts 60a establish a circuit from the battery 64 to the coil 62 when movement in the "plus" direction is required.

When an output is produced on the M7 lead the controlled member 20 is moved toward the position of the command number 60 (FIG. 1) which in this embodiment is illustrated as the "minus" direction. As soon as the member 20 has been moved to the position 62 shown in FIG. 1 which has the reflected binary number 0100000, a coincidence signal exists in both the most significant digit and the next lower order digit. However, the signal in the third digit comprises a binary "1" at the A3 terminal and a binary "0" at the B3 terminal which would normally indicate movement in the plus direction by producing an output on the P5 conductor. If the direction signal were not modified the member 20 would then be moved in the wrong direction, i.e., away from the position 60. However, the signal on the P5 lead is inverted in the logic circuits 53 since a binary "1" coincidence occurs on the terminals A2 and B2 and a modified direction signal is produced on the M6 lead. In the most significant digit a binary "0" coincidence exists on the A1 and B1 terminals so that the direction information on the M6 lead is transmitted without inversion through the logic circuits 50 and appears on the M7 lead so that movement of the member 20 continues in the same direction.

It will be noted in connection with the previously described example that by transmitting a direction signal upwardly from the least significant digit and discarding this information whenever an overriding direction signal is produced in the higher order digit, the logic circuits required for each digit are minimized. This is because it is not necessary to carry a higher order difference signal down through the lower order digits as would be the case where the direction signal is derived starting with the most significant digit and proceeding down to the least significant digit. In the direction system of FIG. 2 the presence of a difference signal in one of the higher order digits merely discards the direction information derived from the lower order digits and this highest order difference signal is then inverted a number of times depending upon the number of binary "1" coincidences which are present in the higher order digits thereabove up to and including the most significant digit.

It is also pointed out that the direction system of FIG. 2 is effective to reverse the direction of movement of the controlled member in the event that its movement overshoots the desired position 60 shown in FIG. 1. Thus, if, due to the inertia of the system, or other factors, the member 20 is moved to the position 60' (FIG. 1) the reflected binary number at this position will be 0111111 and the highest order difference signal with respect to the command number 0111010 will comprise a binary "0" signal at the A5 terminal and a binary "1" signal at the B5 terminal. This would produce an output signal on the M3 lead which would indicate movement of the member 20 should be in the minus direction, i.e., away from the position 60. However, the signal on the M3 lead is inverted three times due to the presence of binary "1" coincidence signals at the A2–B2, A3–B3 and A4–B4 terminals so that the final output signal is on the P7 lead which actuates the relay 60 and reverses the direction of the servo valve 31 so as to move the member 20 back from the position 60' to the position 60.

When all digits of the command and position numbers are in coincidence no signal is produced on either the M7 output lead or the P7 output lead derived from the highest order digit. This will be readily apparent when it is realized that the signal on any one of the P or M leads indicates an anticoincidence of one of the digits of the command and position numbers. Thus, considering the third highest digit, the AND gates 74 and 76 produce outputs only when an anticoincidence signal exists, as described previously and the gate circuits 80, 82, 84 and 86 produce an output signal only when a coincidence signal exists at the A3–B3 terminals in combination with an anticoincidence signal from a lower order digit. It will thus be apparent that if all of the digits are in coincidence no output signal is produced on either the M7 or the P7 lead with the result that both of the relays 60 and 61 are deenergized and movement of the member 20 is terminated since both of the valve control coils 62 and 63 are then deenergized.

In order to provide a number of slowdown points during the traverse of the controlled member 20 so that as this member approaches the command position its speed will be slowed down at successive positions and the member 20 will not overshoot the desired command position, the logic circuits, such as the circuits 56 shown in the bottom half of FIG. 3 are provided for each digit. These logic circuits are collectively arranged to derive certain speed boundary conditions related to the magnitude of the error between the command and position numbers. Specifically, these logic circuits can be arranged to provide an output signal which can be employed to reduce the speed of movement of the controlled member by successive increments whenever the magnitude of the error signal equals one unit of any particular digit of the command number. In the illustrated embodiment of FIG. 2, however, only the third, fourth, fifth and sixth digits are employed to produce slowdown signals, it being understood that one or more of these signals may be eliminated if such a large number of slowdown points is not required or, in the alternative, additional slowdown points may be provided if extreme control over the deceleration rate of the controlled member is required.

In order to provide a suitable slowdown signal by direct comparison of the reflected binary codes comprising the position and command numbers while at the same time providing for maximum speed of the controlled member up to the slowdown point consistent with reduction of speed of movement of the member at the highest possible deceleration rate while preventing overshoot, the respective digits of the command and position numbers are examined, starting with the three highest order digits, to determine whether certain conditions exist in these digits. In accordance with the present invention, these conditions determine the boundary or area within which the error magnitude is equal to or greater than a predetermined value rather than determining whether or not the error is less than a predetermined value. It has been found that when the error is determined in accordance with the conditions described in detail hereinafter, the controlled member may be moved closer to the desired command position before it is slowed down. This results in a substantial decrease in the total time necessary to move the member 20 to a series of predetermined positions.

If the conditions of the present invention are satisfied with respect to the three highest order digits, then one can be sure that irrespective of the reflected nature of the binary codes, the two numbers are not more than one unit of the third order digit apart. The movement of the controlled member may then be slowed down and the top four digits are then considered to see when these same conditions are satisfied and when this occurs a second slowdown may be made with the assurance that the numbers are within one unit apart in the fourth order digit. Similarly, further slowdown points may be achieved by applying these conditions to succeeding lower order digits.

The conditions which must be satisfied to provide a suitable slowdown signal in accordance with the present invention are based upon the logic required to determine when the two reflected binary numbers have a difference of one bit or more rather than by determining when these numbers differ only by one bit or less. The two numbers will have a difference of one bit or more in the least significant digit under consideration if:

(1) The first digit above the lowest order digit under consideration has an anticoincidence signal and an anticoincidence signal occurs in any other digit above this next highest digit; or (2) A binary "1" coincidence occurs in the lowest order digit under consideration and an anticoincidence signal occurs in any one of the higher order digits starting with the second higher order digit up from the lowest order digit under consideration; or (3) A binary "0" coincidence occurs in the lowest order digit under consideration and an anticoincidence signal occurs in the next higher digit.

When all of the conditions, (1), (2) and (3) above are answered in the negative then the sets of digits under consideration are within one bit apart in the least significant digit and a slowdown signal may be initiated accordingly.

To determine whether the above enumerated conditions occur, the logic circuits 56 are provided in each of the third, fourth, fifth and sixth digits of the system of FIG. 2. Specifically, considering the logic circuits 56 shown in FIG. 3, a first pair of AND gates 100 and 102 are employed to detect the presence of an anticoincidence signal of either polarity on the input terminals A3 and B3. Thus, if a binary "1" signal appears on the A3 terminal and a binary "0" appears on the B3 terminal the AND gate 100 will produce an output, it being understood that the inverter 71 in the logic circuit 55 may be employed to invert the B3 signal to simplify the circuitry. Also, if a binary "1" signal appears on the B3 terminal and a binary "0" signal on the A3 terminal the gate circuit 102 provides an output signal. These anticoincidence signals are coupled through an OR gate 104 to the output terminal $\overline{C}3$ leading to the next lower order digit. Also, the output of the OR gate 104 is applied to one input of an OR gate 106 the output of which comprises the $\overline{C}'3$ lead to the next lower order digit. The other input of the OR gate 106 comprises a similar lead $\overline{C}'2$ from the adjacent higher order digit. It will thus be seen if an anticoincidence signal occurs in any one of the digits A1–B1, A2–B2 or A3–B3 an anticoincidence signal will appear on the conductors $\overline{C}3$ and $\overline{C}'3$.

In order to determine condition (1) above an AND gate 108 is provided one input of which comprises the $\overline{C}'1$ output of the highest order digit and the other input of which comprises the $\overline{C}2$ output of the second highest order digit. Accordingly, the gate 108 provides an output only when an anticoincidence signal appears on the terminals A2–B2 and anticoincidence signal appears on the conductor $\overline{C}'1$, i.e., an anticoincidence signal appears at the terminals A1–B1.

In order to determine condition (2) the AND gate 110 is provided, one input of which is connected to the $\overline{C}'1$ lead from the highest order digit, and the second and third inputs comprise the A3 and B3 terminal inputs. Accordingly, if a binary "1" coincidence occurs on the terminals A3 and B3 and an anticoincidence signal occurs two digits higher, i.e., the most significant digit A1–B1, the gate 110 will provide an output.

In order to determine condition (3) above, the three input AND gate 112 is provided one input of which comprises the $\overline{C}2$ lead from the next higher order digit and the second and third leads comprise the output of the inverter 70 and 71. Accordingly, the AND gate 112 will provide an output only when a binary "0" occurs on the terminals A3 and B3 and an anticoincidence signal occurs in the next higher digit A2–B2.

The outputs of the AND gates 108, 110 and 112 are supplied to a three input OR gate 114 the output of which is supplied as one input of an OR gate 116. The output of the OR gate 116 is used as the slowdown signal on the E3 lead representing the third highest digit and the output of the gate 116 is also supplied as a signal to the next lower order digit over the conductor D3. The other input of the OR gate 116 comprises the signal appearing on the D2 lead from the next higher order digit.

When any one of conditions (1), (2) or (3) previously described are present, one of the gate circuits 108, 110 and 112 will provide a positive output signal which will be transmitted through the OR gate 114 and the OR gate 116 to the conductor E3. Accordingly, it is only when none of the gate circuits 108, 110 and 112 produce an output and no signal appears on the conductor D2 from the preceding digit that the signal on the conductor E3 will disappear. It is this disappearance of a signal on the conductor E3 which is used as the actual slowdown signal. More particularly, and referring to FIG. 2, a potential is produced on the conductor E3 during all periods when the command and position numbers have a difference of one bit or more in the third highest digit. When a potential is produced on the conductor E3 the relay 120 is energized and holds the contact 121 thereof closed to the movable arm of the relay so that a circuit is completed between the battery 64 and the contacts of the direction controlling relays 60 and 61. However, when the potential on the conductor E3 disappears the relay 120 is de-energized so as to close the contact 122 thereof with the relay arm with the result that a resistor 123 is inserted in series between the battery 64 and the valve control windings 62 and 63 through the normally closed contact 124 of a relay 125 connected to the E4 lead. In this connection it will be understood that the E4 lead carries a potential at least until the potential on the E3 lead disappears, since the potential on the D3 lead is applied through an OR gate, corresponding to the OR gate 116 of FIG. 3, to the E4 lead. Accordingly, when the potential on the conductor E3 disappears the speed of the controlled member 20 is reduced due to the insertion of the resistance 123 in the circuit, as will be readily understood by those skilled in the art.

In a similar manner, when conditions (1), (2) and (3) cease to exist with respect to the fourth digit, considered as the least significant digit, then the potential on the E4 conductor will disappear and the relay 125 will be deenergized so that the contact 126 thereof is closed to the relay arm and a second series resistor 127 is inserted in circuit with the resistor 123 to the the battery 64 through the closed contact 130 of the relay 131 associated with the E5 lead of the fifth order digit. When the potential on the conductor E5 disappears the contact 132 is closed so as to insert a resistor 133 in series with the resistors 127 and 123 to provide an even slower speed for the controlled member 20 and when the potential on the conductor E6 disappears the final relay 140 is deenergized so as to insert a resistance 141 in series to provide for the final and slowest speed of the member 20 at which speed the member proceeds until coincidence occurs in all of the digits, as described heretofore.

In the logic circuits 54 of the second order digit A2–B2, there will be no input corresponding to the $\overline{C}'1$ signal of FIG. 3 because the digit A2–B2 is the next to highest digit. Accordingly, conditions (1) and (2) can never be satisfied and the gate circuits 108 and 110 may be eliminated in the logic circuits 54. Also, in the logic circuits of the highest digit A1–B1, since there are no higher digits none of the conditions (1), (2) and (3) can be met and the gate circuits 106, 108, 110, 112, 114 and 116 may be eliminated. In this highest order digit the output from the gate circuit 104, which indicates an anticoincidence signal in this digit, is utilized as the output signals $\overline{C}1$ and $\overline{C}'1$ from the logic circuits 51. Since none of conditions (1), (2) and (3) are met in the highest digit there will be no D1 output from this digit. In other respects the logic circuits 51 and 54 operate in a manner identical to that described above in connection with the circuits 56 in FIG. 3.

If it is assumed that a command number corresponding to the position 60 in FIG. 1 appears on the drum 10 and the controlled member 20 is positioned at the position 64 shown in FIG. 1, an anticoincidence signal will be produced on the conductors $\overline{C}1$, $\overline{C}'1$ since the binary "1" signal will exist on the terminal B1 and a binary "0" signal on the terminal A1. In the third digit logic circuits 56 the gate 110 will produce an output since a binary "1" coincidence appears at A3–B3 and a signal appears on the $\overline{C}'1$ lead from the highest order digit. This output from the gate 110 is passed through the gates 114 and 116 to the E3 lead so that the relay 120 is energized and the member 20 is moved at full speed towards the command position 60.

When the position 65 (FIG. 1) is reached the three highest digits become 110. Since an anticoincidence signal now appears at A3–B3 the gates 110 and 112 produce no output. Also, the gate 108 produces no output because no anticoincidence signal exists at A2–B2. Also, there is no signal on the D2 lead from the second digit because a binary "0" coincidence does not exist at A2–B2, i.e., condition (3). Accordingly, the voltage on the conductor E3 disappears and the relay 120 is deenergized so that the member 20 is slowed down by an amount proportional to the value of the inserted resistance 123.

To determine the next slowdown point the four highest order digits are considered and the fourth highest digit A4–B4 becomes the least significant digit. When the position 62 is reached the four highest position digits are 0100 and an anticoincidence signal occurs at the terminals A4–B4. Accordingly, the gate circuits corresponding to 110 and 112 in FIG. 3 produce no output. Also, the gate corresponding to gate 108 in FIG. 3 will produce no output since there is no anticoincidence signal in either of the two highest digits A1–B1 and A2–B2. The gate corresponding to gate 116 in FIG. 3 will also not produce an output since the signal on E3 has disappeared. Accordingly, when position 62 is reached the voltage on E4 disappears so that the relay 125 is deenergized and the resistance 127 is likewise inserted into the circuit to further reduce the speed of movement of the member 20.

To determine the next slowdown point the five highest digits are considered, with the fifth digit being considered as the least significant digit. When the position 63 (FIG. 1) is reached by the controlled member 20 the five highest order digits of the position number will read 01011. In this position none of the conditions (1), (2) or (3) are met and since a potential does not exist on the E4 lead from the previous digit the potential on the conductor E5 disappears and the relay 131 is deenergized to provide a further slowdown by insertion of the resistor 133 into the circuit. In a similar manner, a further slowdown is provided when conditions (1), (2) and (3) are not found in the logic circuits associated with the A6–B6 and the potential on the lead E6 is reduced so that the resistance 141 is inserted into the circuit. The member 20 then proceeds at this speed to the command position 60 at which point both of the relays 60 and 61 are deenergized, is described heretofore, and the member 20 stops.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a control system for moving a member in accordance with numerical input data, means at each desired position of said member for producing a unique pattern representing a plural digit position number, each of said plural digit position numbers differing from the number at the adjacent position by only one digit, means responsive to numerical input data for producing a plurality of electrical signals corresponding to the respective digits of a plural digit command number representing the position to which said member is to be moved, a plurality of sensing devices one for each digit of said plural digit position number and movable as a unit in relation to said pattern in accordance with movement of said member, gate circuit means for individually comparing the output of said sensing devices with different ones of said electrical signals corresponding to different digits of said common number and developing signals representing anticoincidence of each digit of said command number with the corresponding digit of said position number, means for developing a direction signal in response to said gate circuit means associated with the highest order difference in said command and position numbers, means for modifying the sign of said direction signal in accordance with the number of coincidence signals simultaneously produced in digits of higher order than said highest order difference, and means for moving said member in a direction corresponding to said modified direction signal.

2. In a control system for moving a member in accordance with numerical input data, means at each desired position of said member for producing a unique pattern representing a plural digit position number, each of said plural digit position numbers differing from the number at the adjacent position by only one digit, means responsive to numerical input data for producing a plurality of electrical signals corresponding to the respective digits of a plural digit command number representing the position to which said member is to be moved, a plurality of sensing devices one for each digit of said plural digit position number and movable as a unit in relation to said pattern in accordance with movement of said member, gate circuit means for individually comparing the output of said sensing devices with said electrical signals and developing signals representing anticoincidence of each digit of said command number with the corresponding digit of said position number, means for developing a direction signal in response to the gate circuit means associated with the highest order digit in which an anticoincidence signal exists, said direction signal having a sign determined by the relative polarities of the output of the respective sensing device and the corresponding electrical signal, means for modifying the sign of said direction signal in accordance with the number of coincidence signals simultaneously produced in digits of higher order than said highest order anticoincidence digit, and means for moving said member in a direction corresponding to said modified direction signal.

3. In a control system for moving a member in accordance with numerical input data, means at each desired position of said member for producing a unique pattern representing a plural digit position number, each of said plural digit position numbers differing from the number at the adjacent position by only one digit, means responsive to numerical input data for producing a plurality of electrical signals corresponding to the respective digits of a plural digit command number representing the position to which said member is to be moved, a plurality of sensing devices one for each digit of said plural digit position number and movable as a unit in relation to said pattern in accordance with movement of said member, means for individually comparing the output of said sensing devices with said electrical signals and developing signals representing coincidence or anticoincidence of each digit of said command number with the corresponding digit of said position number, means for developing a direction signal corresponding to the highest order digit in which an anticoincidence signal exists and of a sign determined by the relative polarities of said highest order digit signals in said command and position numbers, means for modifying the sign of said direction signal by reversing the significance thereof a number of times equal to the number of coincidence signals simultaneously produced in digits of higher order than said highest order anticoincidence digit, and means for moving said member in a direction corresponding to said modified direction signal.

4. In a control system for moving a member in accordance with numerical input data, means at each desired position of said member for producing a unique pattern representing a plural digit position number, each of said plural digit position numbers differing from the number at the adjacent position by only one digit, means responsive to numerical input data for producing a plurality of electrical signals corresponding to the respective digits of a plural digit command number representing the position to which said member is to be moved, a plurality of sensing devices one for each digit of said plural digit position number and movable as a unit in relation to said pattern in accordance with movement of said member, gate circuit means for individually comparing the output of said sensing devices with said electrical signals and developing signals representing anticoincidence of each digit of said command number with the corresponding digit of said position number, means responsive to said gate circuit means for developing a direction signal having a sign determined by the highest order digit in which an anticoincidence signal is produced, further gate circuit means associated with each digit except the lowest order digit for modifying said direction signal by inverting the sign thereof a number of times equal to the number of coincidence signals produced in higher order digits, means for moving said member in a direction corresponding to said modified direction signal, and means for terminating movement of said member when all digits of said command and position numbers coincide.

5. In a control system for moving a member in accordance with numerical input data, means at each desired position of said member for producing a unique pattern representing a plural digit position number, each of said plural digit position numbers differing from the number at the adjacent position by only one digit, means responsive to numerical input data for producing a plurality of electrical signals corresponding to the respective digits of a plural digit command number representing the position to which said member is to be moved, a plurality of sensing devices one for each digit of said plural digit position number and movable as a unit in relation to said pattern in accordance with movement of said member, first gate circuit means for individually comparing the output of said sensing devices with said electrical signals and developing signals representing anticoincidence of each digit of said command number with the corresponding digit of said position number, means for developing a direction signal having a sign determined by the highest order digit in which an anticoincidence signal is produced, means for moving said member in a direction corresponding to said direction signal, second gate circuit means associated with each digit except the lowest order digit for continuously modifying said direction signal in accordance with the number of coincidence signals simultaneously produced in higher order digits, and means for terminating movement of said member when all digits of said command and position numbers coincide.

6. In a control system for moving a member in accordance with numerical input data, means at each desired position of said member for producing a unique pattern representing a plural digit position number in reflected binary code form, means responsive to numerical input data for producing a plurality of electrical signals corresponding to the respective digits of a plural digit command number in reflected binary code form and representing the position to which said member is to be moved, a plurality of sensing devices one for each digit of said position number and movable as a unit relative to said pattern in accordance with movement of said member, means for individually comparing the output of said sensing devices with said electrical signals and developing signals representing a binary "1" coincidence, a binary "0" coincidence or anticoincidence of each digit of said command number with respect to the corresponding digit of said position number, means responsive to said last named signals for moving said member at a predetermined speed and in a direction to equalize said command and position numbers, means for producing a first output signal having a "1" output only when with respect to a predetermined digit an anticoincidence signal occurs in the next highest order digit than said predetermined digit and an anticoincidence signal simultaneously occurs in any higher order digit than said next higher order digit, means for producing a second output signal having a "1" output only when a binary "1" coincidence signal occurs in said predetermined digit and an anticoincidence signal simultaneously occurs in any higher order digit than said next higher order digit, means for producing a third output signal having a "1" output only when a binary "0" coincidence signal occurs in said predetermined digit and an anticoincidence signal simultaneously occurs in said next higher order digit, means for reducing the speed of movement of said member when all of said first, second and third output signals having a "0" output, and means for terminating movement of said member when all digits of said command and position numbers coincide.

7. In a control system for moving a member in accordance with numerical input data, means at each desired position of said member for producing a unique pattern representing a plural digit position number, each of said plural digit position numbers differing from the number at the adjacent position by only one digit, means responsive to numerical input data for producing a plurality of electrical signals corresponding to the respective digits of a plural digit command number representing the position to which said member is to be moved, a plurality of sensing devices one for each digit of said plural digit position number and movable as a unit in relation to said pattern in accordance with movement of said member, means for individually comparing the output of said sensing devices with said electrical signals and developing signals representing coincidence or anticoincidence of each digit of said command number with the corresponding digit of said position number, means responsive to said last named signals for moving said member at a predetermined speed and in a direction to equalize said command and position numbers, means for producing a first output signal when with respect to a predetermined digit an anticoincidence signals occurs in the next higher order digit than said predetermined digit and an anticoincidence signal simultaneously occurs in any higher order digit than said next higher order digit, means for producing a second output signal when with respect to said predetermined digit a coincidence signal of one type occurs in said predetermined digit and an anticoincidence signal simultaneously occurs in any higher order digit than said next higher order digit, means for producing a third output signal when a coincidence signal of the opposite type occurs in said predetermined digit and an anticoincidence signal simultaneously occurs in said next higher order digit, means responsive to said first, second and third output signals for reducing the speed of movement of said member, and means for terminating movement of said member when all digits of said command and position numbers coincide.

References Cited by the Examiner

UNITED STATES PATENTS 2,538,615　1/1951　Carbrey _____ 340—347
3,172,026　3/1965　Schuman _____ 235—177 X MALCOLM A. MORRISON, *Primary Examiner.*

A. J. SARLI, *Assistant Examiner.*